United States Patent
Iyer et al.

(10) Patent No.: US 11,397,817 B2
(45) Date of Patent: Jul. 26, 2022

(54) BINARY PATCH RECONCILIATION AND INSTRUMENTATION SYSTEM

(71) Applicant: DENSO CORPORATION, Kariya (JP)

(72) Inventors: Gopalakrishnan Iyer, Santa Clara, CA (US); Ameer Kashani, Southfield, MI (US)

(73) Assignee: DENSO CORPORATION

(*) Notice: Subject to any disclaimer, the term of this patent is extended or adjusted under 35 U.S.C. 154(b) by 356 days.

(21) Appl. No.: 16/548,458

(22) Filed: Aug. 22, 2019

(65) Prior Publication Data

US 2021/0056210 A1    Feb. 25, 2021

(51) Int. Cl.
*G06F 21/57*    (2013.01)
*G06F 8/65*     (2018.01)
*G06F 8/41*     (2018.01)
*G06F 11/26*    (2006.01)

(52) U.S. Cl.
CPC ............ *G06F 21/577* (2013.01); *G06F 8/42* (2013.01); *G06F 8/436* (2013.01); *G06F 8/65* (2013.01); *G06F 11/26* (2013.01)

(58) Field of Classification Search
CPC .......... G06F 21/577; G06F 8/42; G06F 8/436; G06F 8/65; G06F 11/26
See application file for complete search history.

(56) References Cited

U.S. PATENT DOCUMENTS

| | | | |
|---|---|---|---|
| 5,946,484 A | 8/1999 | Brandes | |
| 7,284,274 B1* | 10/2007 | Walls | G06F 8/70 |
| | | | 726/25 |
| 7,581,103 B2 | 8/2009 | Home et al. | |
| 9,594,553 B2 | 3/2017 | Ji et al. | |
| 2014/0123110 A1 | 5/2014 | Wan et al. | |
| 2018/0039489 A1* | 2/2018 | Shiraishi | G06F 8/65 |
| 2018/0107821 A1* | 4/2018 | Eshkenazi | G06F 9/328 |
| 2018/0336356 A1* | 11/2018 | Papaxenopoulos | G06F 21/563 |
| 2019/0265965 A1* | 8/2019 | Acharya | G06F 8/658 |
| 2019/0270408 A1* | 9/2019 | Castro | B60Q 9/00 |
| 2020/0042306 A1* | 2/2020 | Kiyama | H04L 67/34 |

* cited by examiner

*Primary Examiner* — Phillip H Nguyen
(74) *Attorney, Agent, or Firm* — Dickinson Wright PLLC (57) ABSTRACT

A binary patch system for a vehicle may include a memory and a controller in communication with the memory and programmed to receive original source code, identify vulnerabilities in original source code, generate binary patch based on the identified vulnerabilities, insert binary patch into original source code, receive feedback of the inserted binary patch, and update the binary patch based on the feedback.

20 Claims, 5 Drawing Sheets

BINARY PATCH RECONCILIATION AND INSTRUMENTATION SYSTEM

TECHNICAL FIELD

The present disclosure relates to binary patch reconciliation and instrumentation systems.

BACKGROUND

As motor vehicles are becoming increasingly connected and are equipped with advanced autonomous driving features, the systems that control advanced vehicle features are including more and more software, programs, algorithms, modules, code, etc. Such software may be susceptible to vulnerabilities, glitches and flaws, that may be exploited by adversaries with malicious intent. These vulnerabilities may lead to faulty execution of programs, as well as leave the software susceptible to security issues, bugs, etc. Such vulnerabilities in software are addressed by creating patches that may attempt to cure the vulnerabilities within the code.

SUMMARY

A binary patch system for a vehicle may include a memory and a controller in communication with the memory and programmed to receive original source code, identify vulnerabilities in the original source code, generate a binary patch based on the identified vulnerabilities, receive feedback of the inserted binary patch, and insert the binary patch into the original source code based on the received feedback.

A method for generating and integrating a binary patch for a vehicle system may include receiving original source code, identifying vulnerabilities in the original source code, generating a binary patch based on the identified vulnerabilities, receiving feedback of the inserted binary patch; and inserting the binary patch into the original source code based on the received feedback A binary patch system for a vehicle may include a memory, and a controller in communication with the memory and programmed to identify vulnerabilities in original source code, generate at least one binary patch based on the identified vulnerabilities, receive feedback based on an application of the binary patch in the original source code, apply a functional test based on the received feedback, and continuously update the binary patch based on the functional test and the received feedback.

A method for generating and integrating a binary patch for a vehicle system may include receiving original source code, identifying vulnerabilities in original source code, generating a binary patch based on the identified vulnerabilities, inserting binary patch into original source code, receiving feedback of the inserted binary patch, and updating the binary patch based on the feedback.

A binary patch system for a vehicle may include a memory, and a controller in communication with the memory and programmed to identify vulnerabilities in original source code, generate at least one binary patch based on the identified vulnerabilities, receive feedback based on the application of the generated binary patch in the source code, apply a functional test based on the received feedback, and continuously update the generated binary patch based on the functional test and received feedback.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Current host-based intrusion detection and prevention systems work by instrumenting vulnerable binaries with binary segments that detect and prevent attacks. This instrumentation results in the original source code, or pre-compilation code, being out of date with the instrumented binary version. This may lead to issues in source code management, firmware provisioning, as well as version control across millions of deployed devices in vehicles. Existing techniques to reverse engineer binary code to derive source code through disassembly are not purposed to resolve inconsistencies between the original source code and the newer binary version, nor do these techniques take into account the out of date instrumentation. In one embodiment, a binary patch instrumentation system recreates original source code from the binary patch with full knowledge of the original source code, including metadata and features such as syntax and semantics. Human generated code may include certain coding styles that are distinctive to source code, such as language, programming paradigm, and elegancy. Extracting of these styles may allow for better integration of the binary patch into the original source code.

Further, existing techniques to reverse engineer binary code may simply generate a generic version of the code. This generic version may have language that is completely different from the original source code. Often the reversed engineered binary code fails to preserve the necessary functional equivalence of the original source code. Patches, when reversed into source code, simply remain patches without the ability to be re-inserted into the correct location of the original source code, thus creating inconsistencies. Accordingly, further described herein is a method to generate a precise location in the original source code for which to insert the binary patch. The system takes into account the original source code's syntax and semantics. Existing methods simply reverse the code into a generic representation of the code and do not take into account such nuances. By accurately inserting the binary patch while considering features such as semantics, results from unit tests, and other optimizations, inconsistencies between the original source code and the patched binary code are avoided.

In the event that the generated patches further fail to preserve the syntax and semantics of the original source code, a loop tester may be included to provide feedback and patch critical security vulnerabilities. The loop testers may take into account the original source code's syntax and semantics and augment the machine generated code.

In the event that the reversed engineered binary code does have the ability to fix quality and security issues, such code may still face testing difficulties. Extensive functional tests may be required and do not provide full code coverage, or may not allow for access to the original source code in order to perform the testing. The system may be further configured to include an automated tester that continuously improves test patterns and identifies vulnerabilities in the source code. A loop tester may also be employed to provide feedback to the automated tester in order to ensure functional equivalence of the generated source code with the binary patch and avoid critical security vulnerabilities. The loop tester may be a qualified software tester or an automaton, preprogrammed tester, or even a machine learning based system. This feedback may identify an incorrect test pattern and provide a correction to continuously improve quality of the patch code.

Thus, a system having increased reliability and quality while maintaining the optimization of the original source code is described herein.

Figure 1:
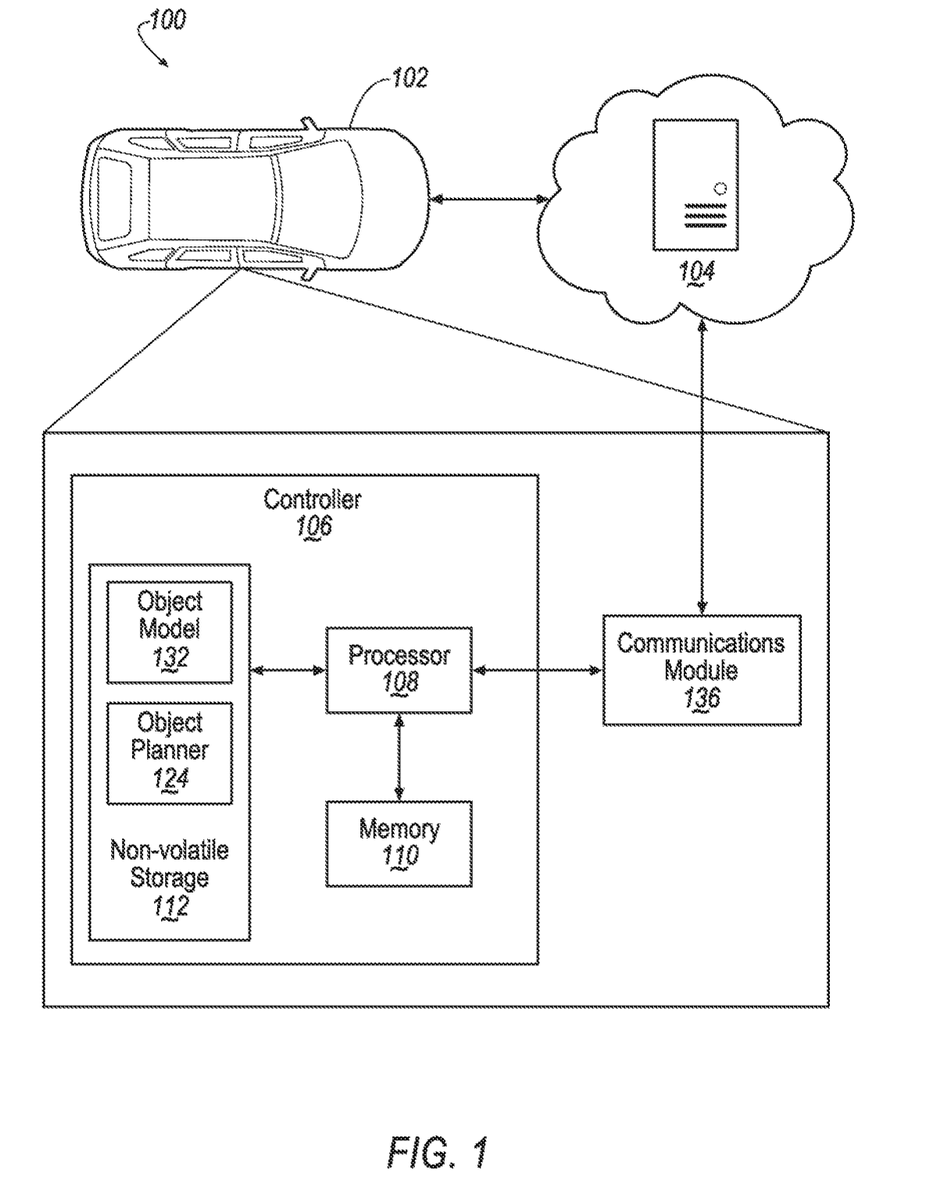
FIG. 1 illustrates a block diagram of a binary patch system for a vehicle.

FIG. 1 illustrates a block diagram of a binary patch system 100 for a vehicle 102. The vehicle 102 may be, but is not limited to, automobiles such as cars, trucks, crossovers, sport utility vehicles, large scale industrial vehicles such as excavators, dump trucks, etc., as well as motorcycles, mopeds, lawn mowers, tractors and the like. While the examples herein disclose and reference vehicular systems, this system is not limited to vehicular application and may be applied to non-vehicle systems, computers, etc. The binary patch system 100 includes systems and methods to resolve inconsistencies in automated binary patch generation for the vehicle's systems. Patching often improves quality of software and may fix bugs, circumvent certain checks, etc. The system 100 may include a remote server 104 where the vehicle 102 may wirelessly communicate with the remote server 104 via one or more networks, such as one or more of the Internet, a local area network, a wide area network, and a cellular network.

The vehicle 102 may include a controller 106. The controller 106 may be a vehicle controller, such as an electronic control unit ("ECU"). The controller 106 may be configured to implement certain systems and processes described herein. The controller 106 may include a processor 108, memory 110, and non-volatile storage 112. The processor 108 may include one or more devices selected from microprocessors, micro-controllers, graphics processing units, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 110. The memory 110 may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage 112 may include one or more persistent data storage devices such as a hard drive, optical drive, tape drive, non-volatile solid-state device, or any other device capable of persistently storing information.

The processor 108 may be configured to read into memory 110 and execute computer-executable instructions embodying one or more software programs, such as an object planner 124, residing in the non-volatile storage 112. The object planner 124 may be part of an operating system or an application, and may be compiled or interpreted from computer programs created using a variety of programming languages and/or technologies, including, without limitation, and either alone or in combination, Java, C, C++, C #, Objective C, Golang, Fortran, Pascal, Java Script, Python, Perl, and PL/SQL. The computer-executable instructions of the object planner 124 may be configured, upon execution by the processor 108, to cause the controller 106 to implement the object planner 124, and correspondingly to implement functions, features, and processes of the object planner 124 described herein.

The non-volatile storage 112 may also include data utilized by the controller 106, or more particularly by the object planner 124, when implementing the functions, features, and processes of the controller 106 described herein. The non-volatile storage 112 may also include one or more database structures for collecting, organizing, and enabling fast retrieval of the data stored therein. For example, the stored data may be arranged in one or more relational databases, one or more hierarchical databases, one or more network databases, or combinations thereof. A database management system in the form of computer software executing as instructions on the processor 108 may be used to access the information or data records of the databases in response to a query, which may be dynamically determined and executed by the object planner 124.

The controller 106 may communicate with other components of the vehicle 102, such as a communications module 136, various proximity sensors, navigation system, etc. The controller 106 may be directly connected to one or more of these other components, such as via various input/output (I/O) ports of the controller 106. Additionally, or alternatively, the controller 106 may communicate with one or more of these other components over one or more in-vehicle networks, such as a vehicle controller area network (CAN), an Ethernet network, a media oriented system transfer (MOST) network, and a wireless local area network (WLAN).

The communications module 136 may be configured to facilitate wireless communication between the vehicle 102 components and other devices and systems external to the vehicle 102, such as the remote server 104, using radio frequency (RF) transmissions. For example, the communications module 136 may include a cellular modem or other wireless network transceiver (e.g., Wi-Fi transceiver) configured to communicate with the remote server 104 over one or more networks, such as one or more of the Internet, a local area network, a wide area network, and a cellular network to which the cellular modem is subscribed. The controller 106 may communicate with the remote server 104 by accessing the communication capabilities of the communications module 136.

The communications module 136 may also include one or more wireless transceivers configured to facilitate direct wireless communication with other devices and systems, such as a personal computer device or key fob, when such other devices and systems are local to (e.g., within direct wireless communication range of) the vehicle 102. To facilitate such local wireless communications, the communications module 136 may include a Bluetooth transceiver, a ZigBee transceiver, a Wi-Fi transceiver, a radio-frequency identification ("RFD") transceiver, a near-field communication ("NFC") transceiver, a vehicle-to-vehicle (V2V) transceiver, a vehicle-to-infrastructure (V2I) transceiver, and/or transceivers designed for other RF protocols particular to remote services provided by the vehicle 102 (e.g., keyless entry, remote start, passive entry passive start, etc.).

Figure 2:
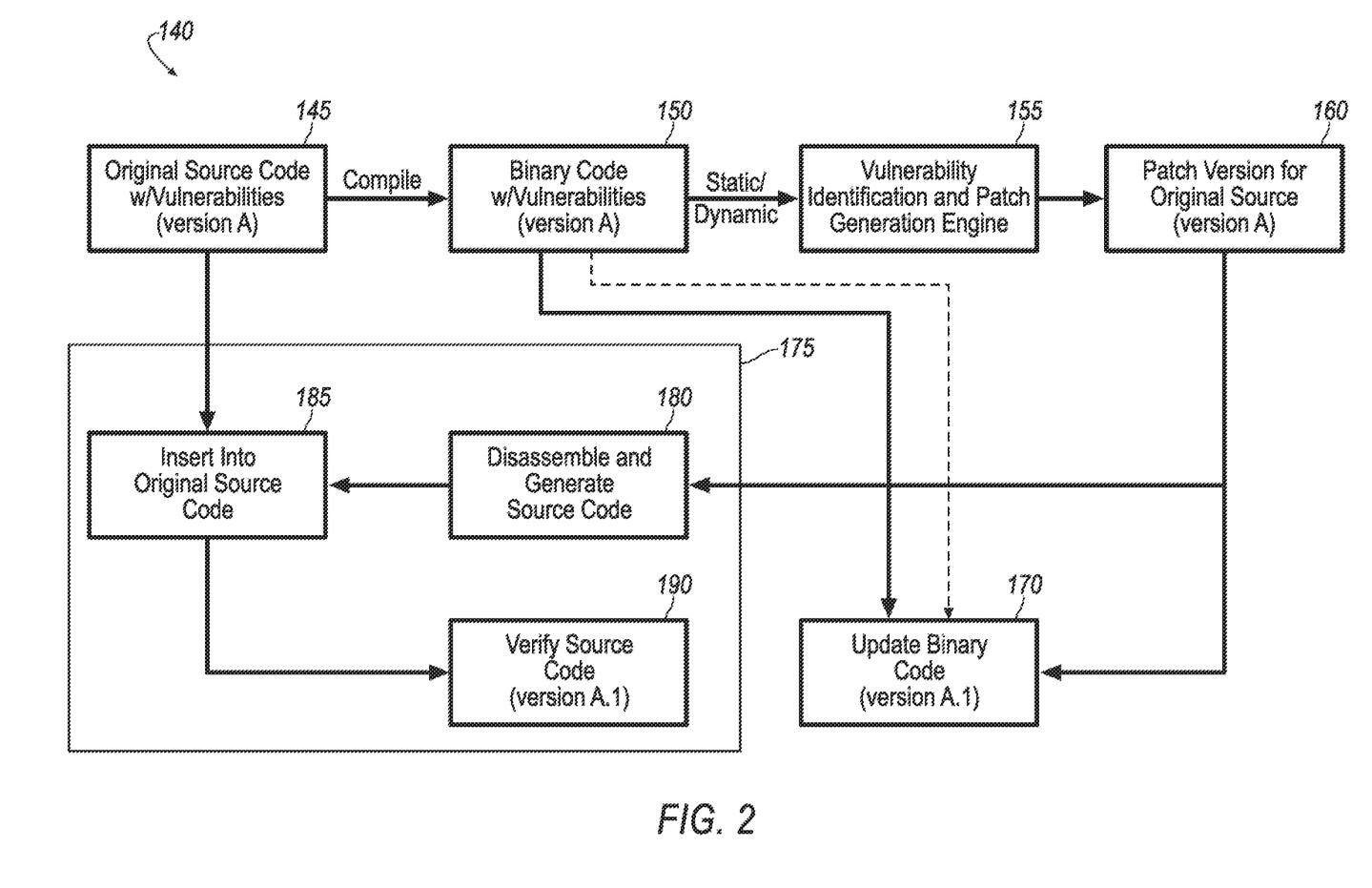
FIG. 2 illustrates an example process of the binary patch system of FIG. 1.

FIG. 2 illustrates an example process 140 of the binary patch system 100 of FIG. 1. The process 140 may begin at block 145 where the processor 108 may receive the original source code. For example, the processor 140 may receive the original source code from the remote server 104, memory 110, or communications module 136. The original source code may be a computer program that is created to achieve a function of or for the vehicle. The original source code may include certain vulnerabilities such as glitches, bugs, etc. The processor 108 may compile the original source code. At block 150, the processor 108 may receive binary code. For example, the processor 140 may receive the binary code from the remote server 104, memory 110, or communications module 136. Binary code is computer code in the form of binary digits 0 and 1. Each series of digits may represent a letter, digit, character, etc., in a computer. Similar to the original source code, this binary code may include vulnerabilities, such as glitches, flaws, bugs, missing encryptions, buffer overflows, input validation issues, data sanitization issues, intraversals, forgeries, lack of integrity checks, broken algorithms, false redirections, broken links, etc. The binary code may be static or dynamic and may be stored within the memory 110, or in a separate memory or cloud-based system.

At block 155 the processor 108 may identify vulnerabilities in the binary code as well as the original source code. These vulnerabilities may include glitches or flaws, may be similar to those described above, such as missing encryptions, buffer overflows, traversals, forgeries, lack of integrity checks, malfunctioning algorithms, false redirections, broken links, etc., in the software that could compromise the code's security in terms of confidentiality, integrity, availability, etc. In identifying these vulnerabilities, the processor 108 may generate a patch for the original source code at block 160. A patch may be a separate text file that includes a list of differences between the original source code and an updated code. Traditionally, the generated patch may be combined with the binary code from block 150 to generate an updated binary code at block 170.

As explained herein, according to one embodiment, the binary patch system 100 may and the process 140 thereof may include a sub-process 175 for resolving inconsistencies in the binary patch. This is also referred to herein as an inconsistency resolution system 175. At block 180 of the sub-process 175, the processor 108 may disassemble and generate source code. This may include disassembling the binary patch generated at block 160, reconstruction of the disassembled source code using the original source code semantics, syntax, etc., and insertion of a generated source patch into the original source code.

Figure 3:
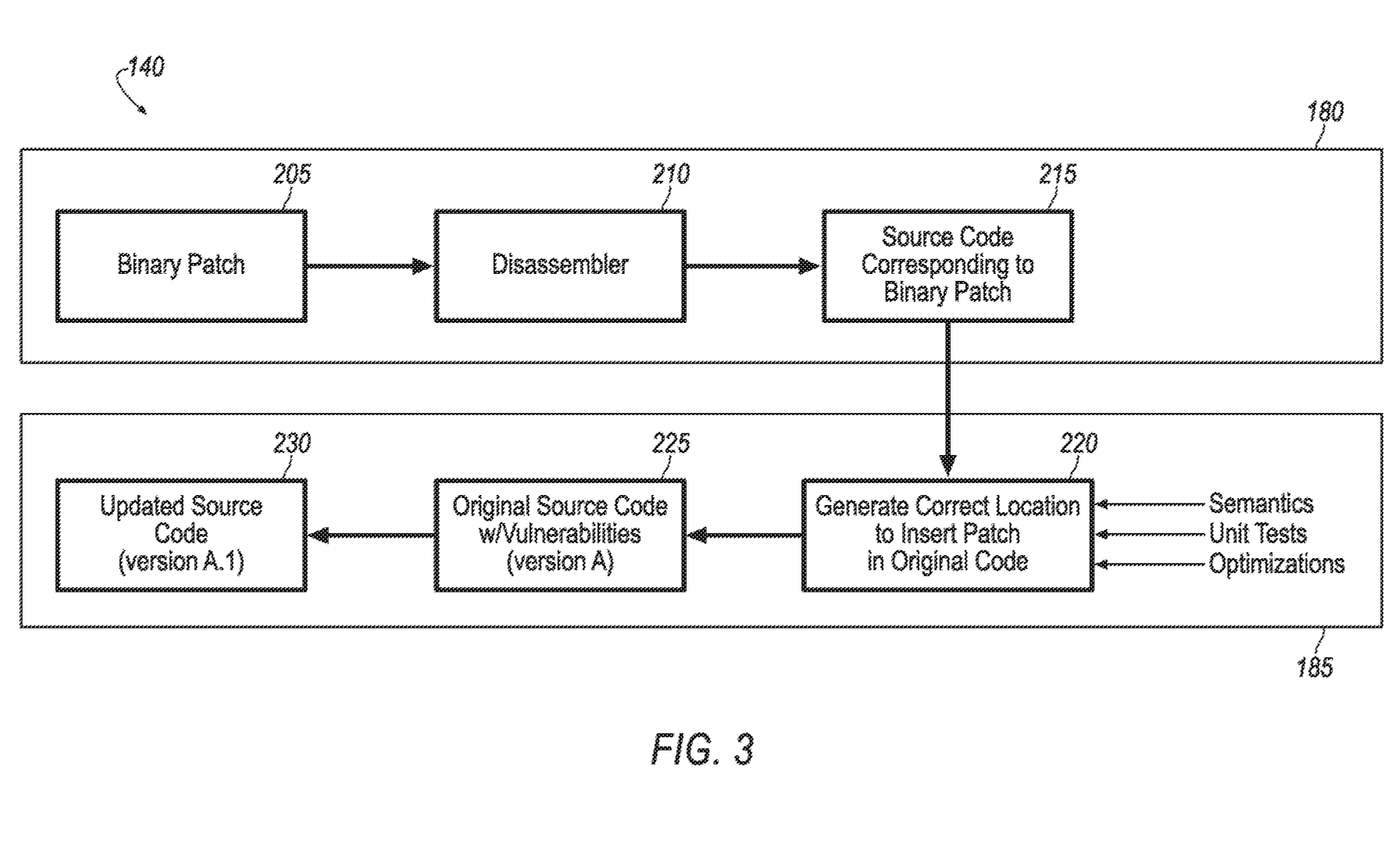
FIG. 3 illustrates a detailed block diagram of blocks 180 and 185 of FIG. 2.

FIG. 3 illustrates a detailed block diagram of block 180 of FIG. 2. Here, at block 205, the processor 108 may receive the generated binary patch. As explained above, the binary patch may be generated to address software vulnerabilities for the original source code. The processor 108 may then, at block 210, disassemble the generated binary patch. The disassembly may translate or map the binary code. The disassembly may be performed in a linear or recursive fashion. At block 215, the processor 108 may reconstruct the disassembled binary patch using the original source code semantics, syntax, etc.

The semantics may include certain coding styles that are distinctive to source code, such as language, programming paradigm, and elegancy. Reconstruction of these styles may allow for better integration of the binary patch into the original source code. Code semantics follow directly from syntax. Whereas syntax relates generally to the structure or grammar of a programming language, and providing rules to construct valid sentences, semantics relate to the meaning or the validity of the constructed sentence in the given programming language. Two statements in a programming language can be syntactically correct but vary vastly in result or output produced during execution. The usage of data types, pointers, pre and post operators (e.g., ++ operator), terminators (such as the semi-colon ';') in various locations of the code can change the semantics of it, based on the validity of the operation. Another example is the declaration of variables and variable naming conventions. Variables declared at various locations of the code could hold special meaning for the human programmer and could emphasize the significance of the output of a function. A compiler typically takes into account only the syntax of a program, whereas semantics is human interpretation of code with factors such as elegancy, readability, abstract meaning in-terms of pseudo-code etc.

Thus, at block 180, the processor 108 may reverse engineer a source code segment from the generated binary patch and extract certain features such as the syntax and semantics from the original source code. This may account for certain versioning and maintenance of the original source code. The original source code may be recreated from the generated binary patch based on the original source code's metadata and features. The metadata may be certain properties of the code such as title, creation date, edit dates, etc. It may include license terms, copyright notices and provisions, as well as file types, sizes, compression types, etc. This may allow the processor 108 to recognize unique characteristics organic to human written code such as language and style, including for example, the type of language, programming paradigm, and elegancy.

Returning to FIG. 2, the process 140 may proceed to block 185. At block 185, the processor 108 may insert the generated binary patch into the original source code, thus resolving source and binary version inconsistencies. Referring once again to FIG. 3, at block 220, the insertion of the binary patch into the original source code may include taking into consideration the location at which to insert the patch. Reconstruction of the original source code from the binary patch could lead to incorrect behavior in functional tests of the original source code, in part, because the binary patch is not inserted at the correct location in the original code. The location of the binary patch may be determined based on the semantics and/or syntax of the original source code, as well as other unit tests and optimizations.

Optimization techniques that are part of compiler options when a C program is compiled into assembly code, may be of three broad categories including compute bound, memory bound, and I/O (Input Output) bound. Techniques include but are not limited to code in-lining, loop unrolling, loop inversion, loop invariance, table lookup, stack usage, machine-specific optimization, link time optimization, padding, locality of reference, sequential access, random access, parallelism, recursion, etc. Such techniques may be implemented in a non-standard way to create optimized assembly code, specific to each target device. During the compilation process, such optimization option information is lost. Knowledge of this optimization information can vastly improve the quality of the source code during the process of reversing it from assembly code.

Further, in order to insert the binary patch into the original source code, the processor 108 may use results from unit tests to insert the patch at the correct location. Unit tests are designed to validate every single unit of the software function. For example, in procedural languages like C, a unit may be a single program or a process, whereas in object oriented languages such as C++, it may be a base class, abstract class, or super class. A function, loop, method, or a statement is executed with various combinations of valid data and matched against expected results. In the discussed unit tests, corresponding program line numbers or annotations in original source code are recorded when tests meet the passing criteria. This program line number is the correct location at which the tested code may be re-inserted in order for the original program to function correctly. The processor 108, as explained above, may also extract source code semantics and insert the binary patch based on these semantics. Further, the binary patch is inserted into the original source code so that the original source code optimizations are maintained. The processor 108 may insert the binary patch at block 225 to generate the updated source code at block 230.

Because the features of the original source code are taken into consideration when inserting the patch, the patch is inserted at a precise location to ensure quality reconstruction of the binary patch. This leads to an improvement in the source code quality.

At block 190, the processor 108 may perform a quality verification on the updated source code. While the updated source code may be reconstructed based on several features as discussed above, the source code may be less than perfectly functional. In some examples, a single segment of binary code could be disassembled and mapped to multiple segments of source code that achieve the same function. Further, while the correct syntax may be used in generating the updated source code, the semantics may not be consistent. Thus, additional testing and verification may be beneficial in improving the reconstruction of the original source code.

Figure 4:
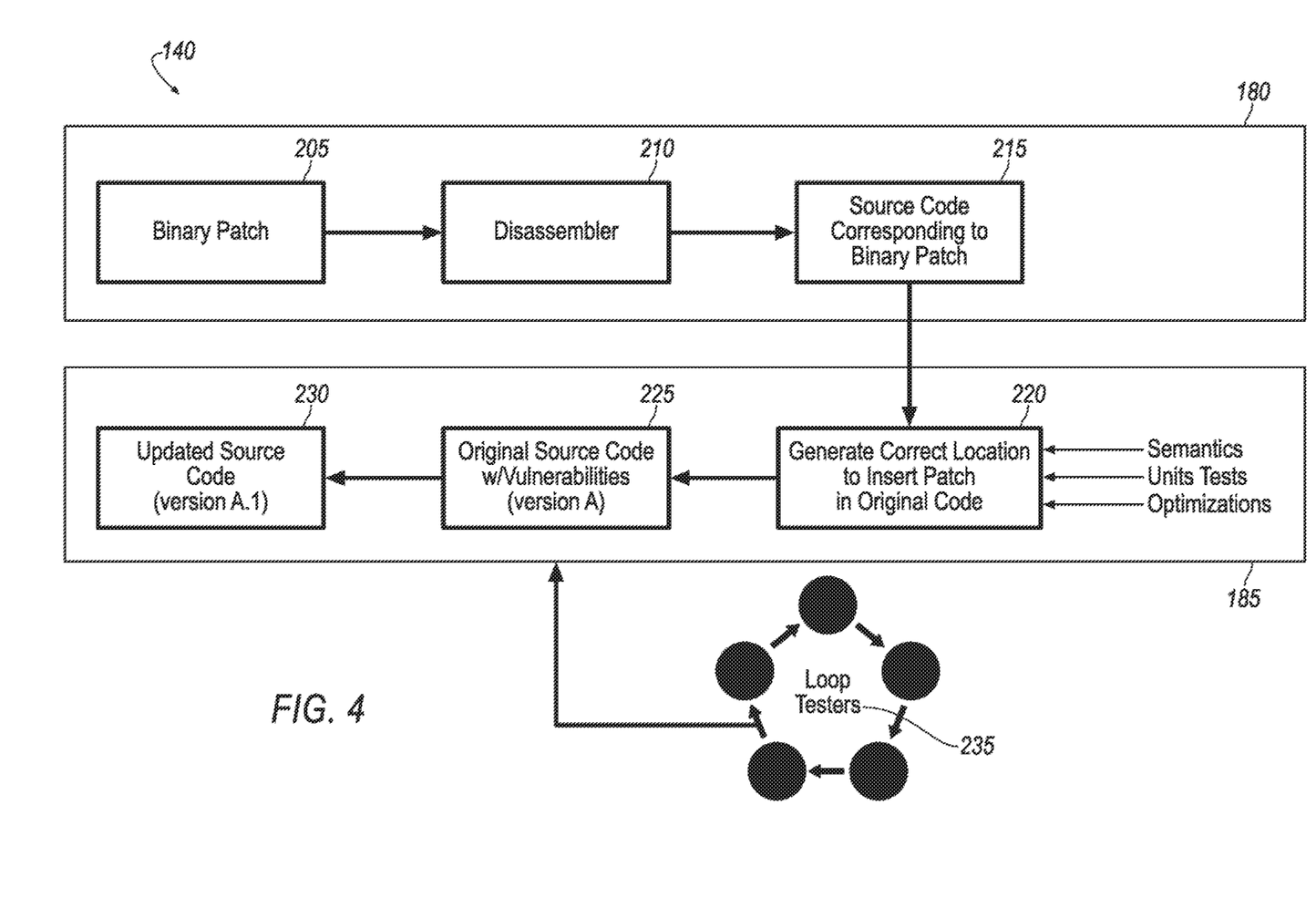
FIG. 4 illustrates a detailed block diagram of blocks 180, 185, and 190 of FIG. 2.

Referring to FIG. 4, which illustrates another detailed block diagram of blocks 180 and 185 of FIG. 2, block 190 may include a loop tester at block 235. The processor 108 may receive loop tester improvements to further align the semantics and syntax of the binary patch to the original source code. The processor 108 may receive such feedback from one or more testers configured to manually examine the binary patch and source code and make continual and active edits to the code. This feedback allows the processor 108 to better align the original source code semantics and syntax while ensuring functional equivalence. The feedback allows for a better extraction of subsequent code versions. The testers may modify and edit the updated source code. These testers may be familiar with the original source code, may be crowd sourced testers, or may be automatons, machine learning systems, etc.

Figure 5:
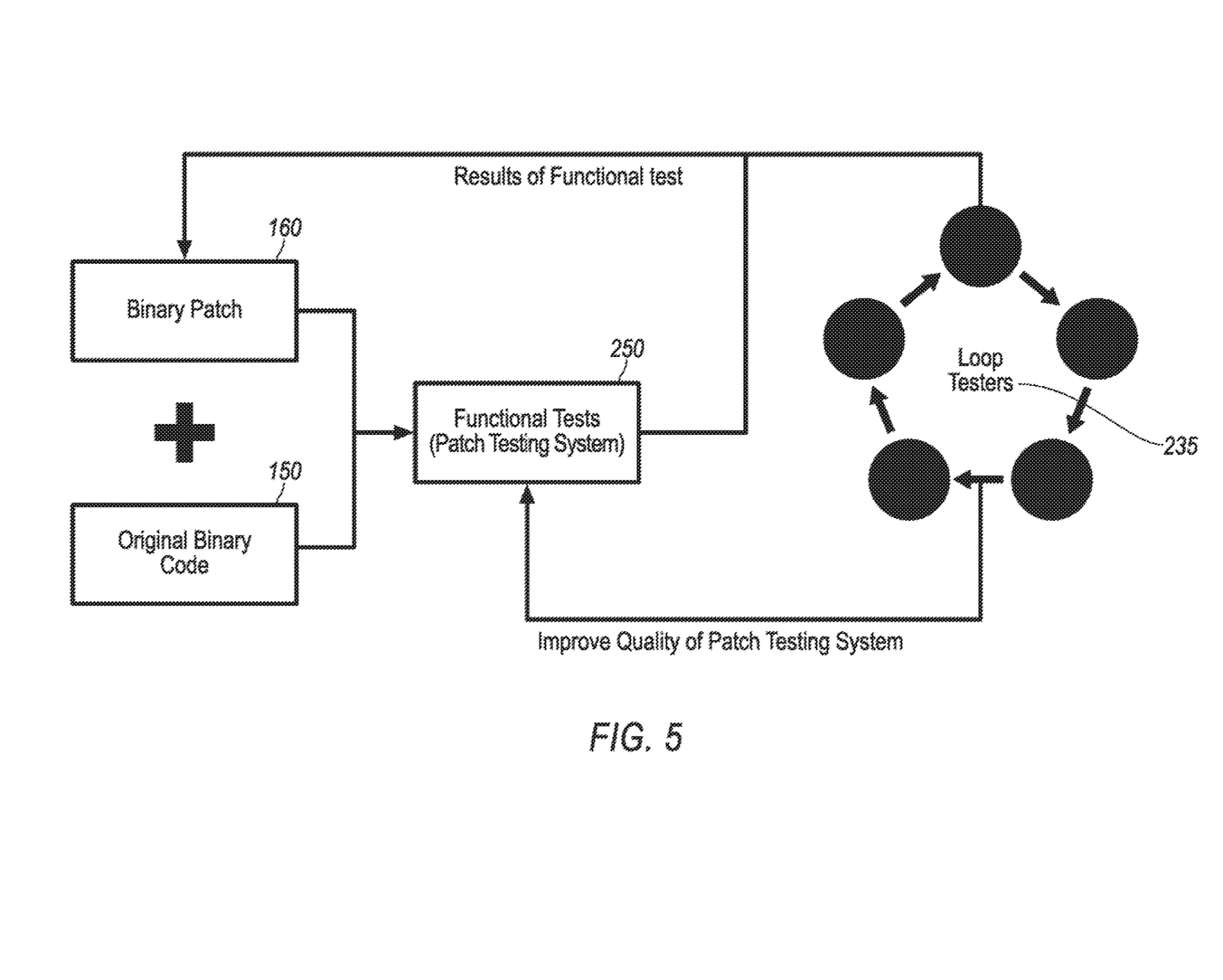
FIG. 5 illustrates a detailed block diagram of block 190 of FIG. 2.

FIG. 5 illustrates another example of block 190, including performing a functional test at block 250. The processor 108 may receive the binary patch from block 160, as well as the original binary code from block 150. The loop tester 235 may then perform functional tests on the code, and provide feedback to the processor 108 at block 250. The loop tester 235 may improve the quality of the automated tester which performs functional tests on the source code generated by the automated engine. The loop tester 235 may be capable of patching critical security vulnerabilities in the code. The loop tester 235 may also ensure functional equivalence of the generated source code with the binary patch. This feedback input into the automated tester may identify when an incorrect test pattern is generated. This allows the test pattern to be improved and corrected continuously, thus improving the automated tester.

Moreover, the automated tester may achieve various forms of machine learning as the processor 108 receives feedback from the loop testers 235. This may be based on results on inputs to testing, optimization tests, along with the tester feedback. To increase security, the automated tester may have access to the entire updated source code. To the contrary, the loop tester 235 may only have access to a portion of the code, e.g., the binary patch. Thus, this may maintain security by preserving source code confidentiality, especially when outsourcing the loop tester functions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A binary patch system for a vehicle, comprising:
a memory; and
a controller in communication with the memory and programmed to:
receive original source code;
identify vulnerabilities in the original source code;
generate a binary patch including binary code of the vehicle, wherein the binary patch is based on the identified vulnerabilities of the original source code;
receive feedback upon analyzing both the binary patch and the original source code;
insert the binary patch into reconstructed code utilizing the original source code and by utilizing at least disassembled source code, in response to received feedback; and
update the original source code utilizing the binary patch and the reconstructed source code.

2. The system of claim 1, wherein the feedback includes modifications to at least one of syntax or semantics of the binary patch to match at least one of syntax or semantics of the original source code.

3. The system of claim 1, wherein the controller is further configured to apply a functional test based on the received feedback to iteratively update the binary patch.

4. The system of claim 3, wherein the controller is further configured to apply results from the functional test to update the binary patch.

5. The system of the claim 1, wherein the controller is further configured to extract semantics from the original source code and insert the binary patch into the original source code based on the extracted semantics.

6. The system of claim 5, wherein the binary patch is inserted into a specific segment of the original source code based on the extracted semantics.

7. The system of claim 1, wherein the feedback is based on a review of the generated binary patch.

8. A method for generating and integrating a binary patch for a vehicle system, comprising:
receiving original source code;
identifying vulnerabilities in the original source code;
generating a binary patch including binary code of the vehicle, wherein the binary patch is based on the identified vulnerabilities of the original source code;
receiving feedback of the generated binary patch; and
inserting the generated binary patch into reconstructed code utilizing the original source code by utilizing at least disassembled source code, in response to received feedback; and
updating the original source code utilizing the binary patch and the reconstructed source code.

9. The method of claim 8, wherein the feedback includes modifications to at least one of syntax or semantics of the binary patch to match at least one of syntax or semantics of the original source code.

10. The method of claim 8, further comprising applying a functional test based on the received feedback to iteratively update the binary patch.

11. The method of claim 10, further comprising applying results from the functional test to update the binary patch.

12. The method of the claim 10, further comprising extracting semantics from the original source code and inserting the binary patch into the original source code based on the extracted semantics.

13. The method of claim 12, wherein the binary patch is inserted into a specific segment of the original source code based on the extracted semantics.

14. The method of claim 8, wherein the feedback is based on a review of the generated binary patch.

15. A binary patch system for a vehicle, comprising:
a memory; and
a controller in communication with the memory and programmed to:
identify vulnerabilities in original source code;
generate at least one binary patch including binary code of the vehicle, wherein the binary patch is based on the identified vulnerabilities;
receive feedback upon analyzing both the binary patch and the original source code;
apply a functional test based on the received feedback; and
continuously update the binary patch based on the functional test and the received feedback;
insert the binary patch into reconstructed code utilizing both the original source code and at least disassembled source code, in response to the received feedback; and
update the original source code utilizing the binary patch and the reconstructed source code.

16. The system of claim 15, wherein the feedback includes modifications to at least one of syntax or semantics of the binary patch to match at least one of syntax or semantics of the original source code.

17. The system of claim 16, wherein the controller is further configured to apply results from the functional test to update the binary patch.

18. The system of the claim 15, wherein the controller is further configured to extract semantics from the original source code and insert the binary patch into the original source code based on the extracted semantics.

19. The system of claim 18, wherein the binary patch is inserted into a specific segment of the original source code based on the extracted semantics.

20. The system of claim 18, wherein the binary patch is inserted into a specific segment of the original source code based on optimization techniques.

* * * * *